Jan. 19, 1971          J. S. WILCZYNSKI          3,556,630
METHOD AND APPARATUS FOR OBTAINING, BY A SERIES OF SAMPLES, THE
INTENSITY DISTRIBUTION ACROSS SOURCES OF INCOHERENT
ELECTROMAGNETIC WAVES TO PRODUCE A SINGLE
COMPOSITE PICTURE
Filed Aug. 14, 1968                                    7 Sheets-Sheet 1

INVENTOR
JANUSZ S. WILCZYNSKI

BY John J. Goodwin

ATTORNEY

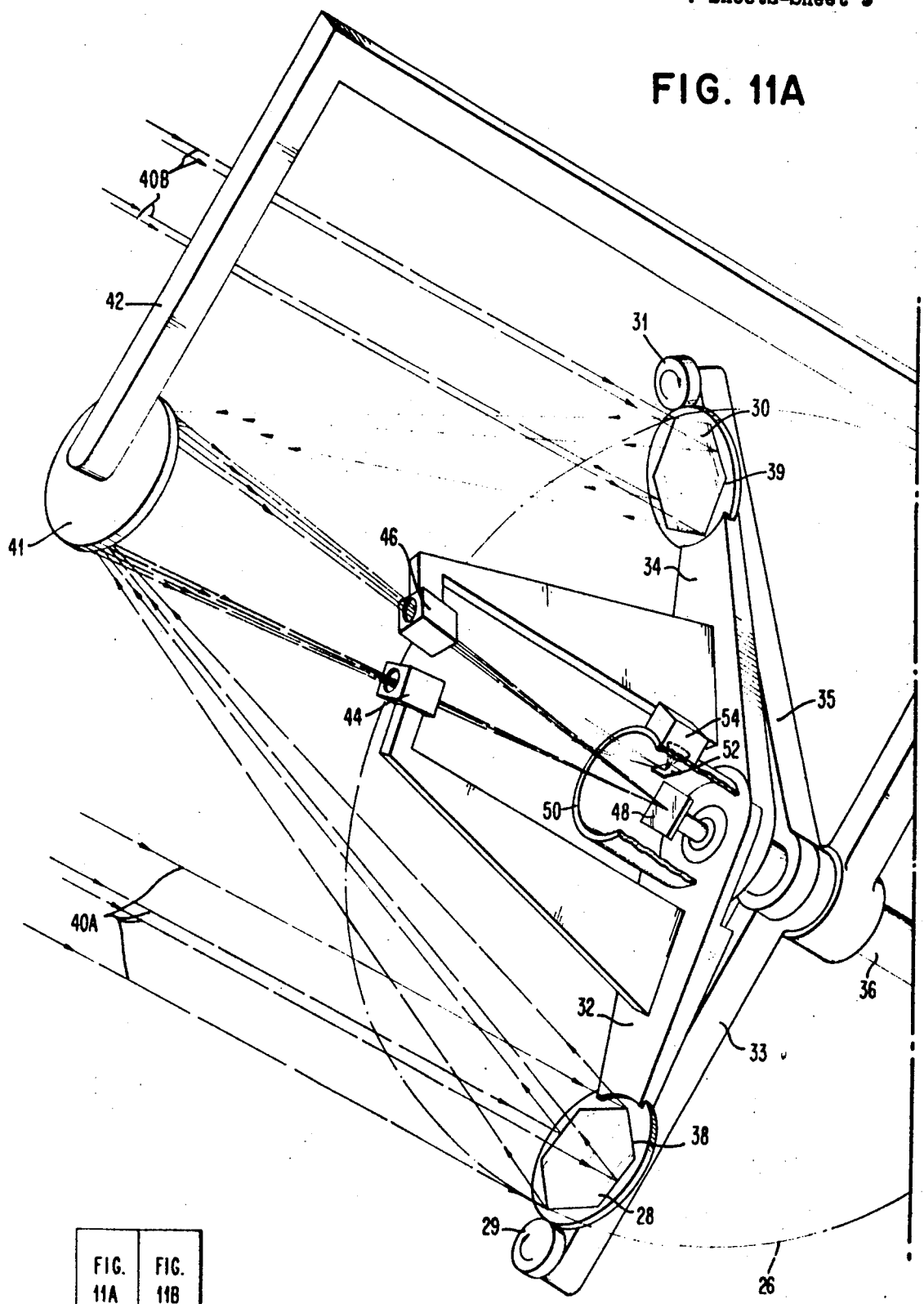

Jan. 19, 1971 J. S. WILCZYNSKI 3,556,630
METHOD AND APPARATUS FOR OBTAINING, BY A SERIES OF SAMPLES, THE
INTENSITY DISTRIBUTION ACROSS SOURCES OF INCOHERENT
ELECTROMAGNETIC WAVES TO PRODUCE A SINGLE
COMPOSITE PICTURE
Filed Aug. 14, 1968
7 Sheets-Sheet 5

Jan. 19, 1971  J. S. WILCZYNSKI  3,556,630
METHOD AND APPARATUS FOR OBTAINING, BY A SERIES OF SAMPLES, THE
INTENSITY DISTRIBUTION ACROSS SOURCES OF INCOHERENT
ELECTROMAGNETIC WAVES TO PRODUCE A SINGLE
COMPOSITE PICTURE
Filed Aug. 14, 1968

United States Patent Office 3,556,630
Patented Jan. 19, 1971

1

3,556,630
METHOD AND APPARATUS FOR OBTAINING, BY
A SERIES OF SAMPLES, THE INTENSITY DISTRI-
BUTION ACROSS SOURCES OF INCOHERENT
ELECTROMAGNETIC WAVES TO PRODUCE A
SINGLE COMPOSITE PICTURE
Janusz S. Wilczynski, Ossining, N.Y., assignor to International Business Machines Corporation, Armonk, N.Y., a corporation of New York
Filed Aug. 14, 1968, Ser. No. 752,610
Int. Cl. G02b 23/06, 27/00
U.S. Cl. 350—3.5
12 Claims

ABSTRACT OF THE DISCLOSURE

A method and apparatus is described for obtaining information related to an object, such as in microscopy or astronomy or any other object absorbing, scattering or radiating incoherent electromagnetic waves. The apparatus performs a sequence of observations of the intensity distribution across the object or source of the incoherent electromagnetic waves in a detection plane corresponding to the image plane in conventional image forming systems. Throughout this sequence of observations, a known coordinate system is ascribed to the object. Every point of the object may be thought of as being a source of a spherical electromagnetic wave. In every observation, two different parts of this wave are brought to a common area in the apparatus detection plane where the intensity of the interaction of the two parts of the wave are recorded. Similarly, two parts of the spherical wave from the neighboring point of the object are brought to a neighboring common area and so on. In a single observation, the portions of the electromagnetic wave which arrived at the detection plane have the same shape in the apparatus collecting area, although their direction, amplitude and other properties may be different. In subsequent observations, this shape or relative position of the two parts is altered. Many observations may be required to fully describe the object, but when an appropriate combination of the samples of spherical waves is sequentially brought to the detection plane and recorded, a composite single image will be obtained after appropriate processing. Embodiments of the invention as an astronomical telescope and as an X-ray microscope are disclosed. Data acquisition is obtained through a telescope having two apertures which are moved to predetermined positions and the object is sequentially sampled over a set of discrete ranges of spatial frequencies and the resultant observations are processed to form a single picture. A similar procedure is employed in the embodiment of the X-ray microscope. It is assumed that the object does not vary substantially during the set of observations required to describe it fully, or if it does vary, the rate of such change is known.

BACKGROUND OF THE INVENTION

Field of the invention

The field to which this invention pertains is the field of image forming systems throughout the range of electromagnetic spectrum including X-rays, radio and optical frequencies and to all other types of image formation when linearity is approximately obeyed.

SUMMARY OF THE INVENTION

The present invention relates to an image forming method and apparatus and in particular to a method and apparatus useful in the study of objects radiating, reflecting or being transparent to incoherent electromagnetic waves. An object of the present invention provides a method and apparatus for obtaining an image of the intensity of incoherent electromagnetic radiation coming from objects such as self-luminous astronomical or other objects, objects scattering radiation or objects transmitting such radiation as, for instance, microscopical specimens, and in all cases throughout the electromagnetic spectrum.

The invention is particularly useful in environments where a large aperture is desired for resolution but where practical considerations limit the size of the aperture which can be employed, for example, astronomical telescopes and X-ray microscopes. The effect of a large aperture is produced in the present invention by a series of observations obtained with a pair of smaller apertures.

The foregoing and other objects, features and advantages of the invention will be apparent from the following more particular description of the preferred embodiments of the invention, as illustrated in the accompanying drawings.

BRIEF DESCRIPTION OF THE DRAWINGS

In the drawings:

FIG. 11 indicates how FIG. 11A and FIG. 11B are combined to provide a detailed schematic illustration of an embodiment of a telescope following the principles of the present invention;

DESCRIPTION OF THE PREFERRED EMBODIMENTS

Figure 1:
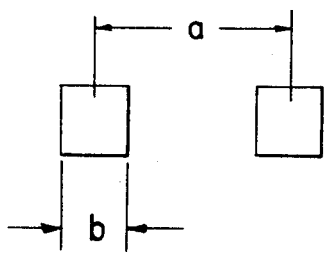
FIG. 1 is a schematic illustration of two square apertures used in the explanation of the present invention.

An embodiment of the present invention in the form of an astronomical telescope will be described, however, introductory material will first be provided relating to the theory of operation of the invention.

Any observation of an incoherent, extended object, for example, an observation through an astronomical telescope, introduces an uncertainty as to the intensity distribution within any of its parts subtending an angle of $\lambda/D$ (the ratio of the wavelength $\lambda$ to the distance $D$ of two parts of the wavefront most widely separated and brought to a common area in the image plane). The only way to increase the resolution at a given wavelength, if no prior knowledge of the object exists, is to increase the length D. This statement is true for radio, optical, and X-ray frequencies and is the reason that astronomical telescopes require large diameter mirrors to obtain high resolution.

An object intensity distribution $I_0$ $(x, y)$ gives rise in the focal plane of a telescope to an image intensity distribution $I_1$ $(x_1, y_1)$. If the transmission function $K$ (amplitude distribution in the telescope focal plane due to a point source) is known, then the image intensity distribution is represented by the expression $$I_1(x_1, y_1) = C \int\int I_0(x, y) |K(x_1-x), (y_1-y)|^2 \, dx \, dy \quad (1)$$

where C is a photometric constant. Expression 1 may be written in the "spatial" or "angular" frequency domain as $$F_1(f, g) = F_0(f, g) T(f, g) \quad (2)$$

where $f, g$ are two-dimensional spatial frequency coordinates. The image spectrum $F_1(f, g)$ is obtained by multiplying the object spectrum $F_0(f, g)$ by $T(f, g)$. $T(f, g)$ is the Modulation Transfer Function of the optical system referred to hereinafter as MTF. It should be emphasized that $F_0(f, g)$ is a complex Fourier spectrum which consists of a real function and a complex function which may be written as $$R_0(f, g) e^{-j2\pi\phi(f,g)} \quad (3)$$

$T(f, g)$ is also a complex Fourier spectrum and may be written $$P_0(f, g) e^{-j2\pi\phi(f, g)} \quad (4)$$

The MTF is the Fourier transform of $|k(x_1, y_1)|^2$. In the case of a lens with no phase errors and constant transmission, the MTF for incoherent objects is the autocorrelation function of the aperture. When a rectangular aperture is employed and if only one-dimensional objects are considered, the maximum frequency (that is the frequency which is the limit of resolution) is expressed $$v_{max} = \frac{\sin u'}{0.5\lambda} \quad (5)$$

where $u'$ is the angle between the maximum ray transmitted by the lens from an axial point and the axis of the lens, and $\sin u'$ is then numerical aperture of the lens.

For a basic discussion of the Modulation Transfer Function, and in particular the transfer function of an incoherent object see "Applied Optics: A Guide to Modern Optical System Design" by Leo Levi, copyright 1968 by John Wiley & Sons Inc., Library of Congress Catalog Number 67–29942.

Figure 2:
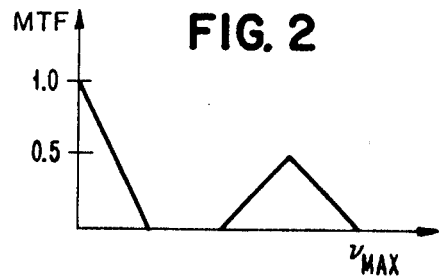
FIG. 2 is a schematic illustration of the modulation transfer function of the apertures of FIG. 1.
Figure 3:
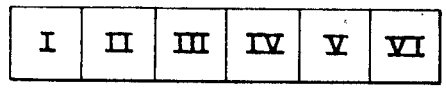
FIG. 3 is a schematic illustration of six square apertures arranged in a strip which is used in the explanation of the present invention.
Figure 4:
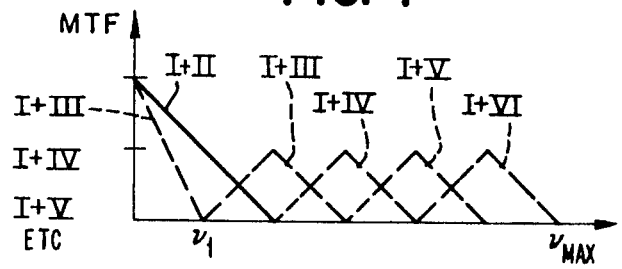
FIG. 4 is a schematic illustration of the modulation transfer functions of pairs of the apertures of FIG. 3.
Figure 5:
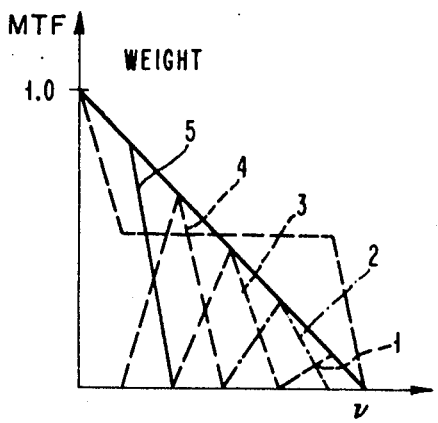
FIG. 5 is a schematic illustration of the modulation transfer functions of FIG. 4 after weights have been applied.

Referring to FIG. 1, two identical optical apertures having an edge length $b$ are shown separated by a distance $a$ center-to-center and having a common focus and wherein edge length $b$ is not small compared with $a$. FIG. 2 shows the corresponding one-dimensional MTF of the two apertures. FIG. 3 shows a "strip" telescope made up from $i$ separate aperture parts where $i$ is shown to be 6. If the MTF's for aperture pairs $I+II$, $I+III$ ... $I+i$ of the strip telescope of FIG. 3 are plotted along the $v$ axis (the spatial frequency), where $v_{max}$ corresponds to the limit of resolution for the two outer apertures, the result will consist of triangles evenly spaced along the axis with the MTF in the low frequency range $v < v_1$ repeated identically $i-2$ times as shown in FIG. 4. Only the pair $I+II$ has a different low frequency content because pair I and II are adjacent and correspond to a single aperture. The combined MTF for $i=6$ is shown in FIG. 5 where the low frequency redundancy is removed and where the contributions at the other frequency ranges are weighted according to the number of occurrences of a given pair within the strip, for example, $I+III$ is multiplied by 4 because $I+II$ can be shifted to occupy a total of four possible positions on the strip. The result is the one-dimensional MTF of a telescope for incoherent illumination and is represented by the solid straight line in FIG. 5.

A formal solution to the two-dimensional problem can now be provided. Any object distribution $I_0(x, y)$ may be transformed into polar coordinates $I_0(\rho, \theta)$, where $\rho$ is the radial coordinate and $\theta$ is the angular coordinate, and its two-dimensional spectrum obtained by using a number of observations from "strip" telescopes at different azimuths and combining the results as above.

All separate observations must be Fourier transformed with appropriate spatial phase factors $e^{-j2\pi\phi(f, \theta)}$ since all observations must be referred to the same coordinate system before the Fourier transforms of other observations are added, and low frequency redundancy removed. The required transformation from a polar to a rectangular coordinate system is then accomplished by known numerical interpolation techniques in the frequency domain. The result is then inverted by a second Fourier transformation to give the image $I_1(f, g)$, application of weights being optional. If the weights are applied, the image will be reconstructed as seen through a normal telescope and the MTF is represented by the solid line in FIG. 5. If no weights are applied, the instrument has an MTF given by the dashed line in FIG. 5 for a one-dimensional case.

Figure 6:
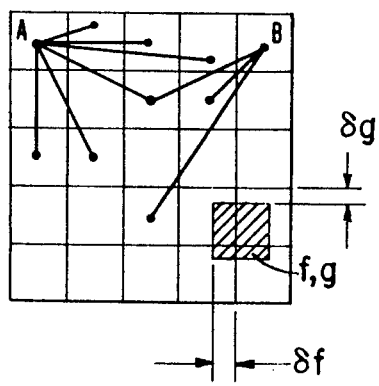
FIG. 6 is a schematic illustration of a plurality of square apertures arranged in a two-dimensional square array.

In general, at optical frequencies it is more advantageous, because of a lower redundancy, to work directly in two dimensions using a 'square' or preferably a "hexagonal" telescope. Consider a "square" telescope having its dimensions extended by factor of five ($i=5$) as shown in FIG. 6.

Figure 7:
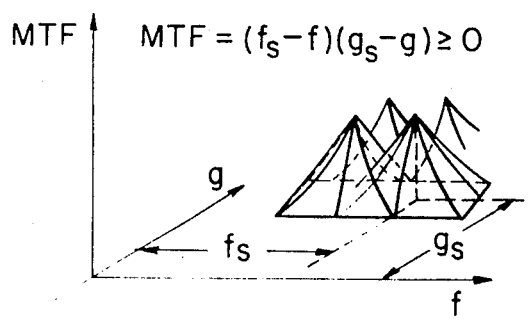
FIG. 7 is a schematic illustration of the modulation transfer function of apertures of FIG. 6.

The response at any arbitrary spatial frequency $f$, $g$, in the range $$\frac{f_{max}}{5} \leq f \leq \frac{4}{5} f_{max}$$

$$\frac{f_{max}}{5} \leq g \leq \frac{4}{5} f_{max}$$

is the sum of the contributions of four observations and will be equal to (before normalization and with each aperture being a unit square)

$$T(f, g) = (1-\delta g)(1-\delta f) + \delta f(1-\delta g) + (1-\delta f)\delta g + \delta f \delta g = 1 \quad (6)$$

wherein $\delta f$ and $\delta g$ are as given in FIG. 6. Outside these ranges for $f$ and $g$, fewer than four observations contribute to T. This is to be expected since the cross-correlation of a unit square with the whole aperture, at any $f, g$, in the above range, will be unity, either the product of its area with itself or the sum of the contributions of four observations as shown in the MMTF for the two-dimensional case as shown in FIG. 7. Spatial frequencies within the common range will automatically have the same phase in all four observations covering that range and any departure in phase proportional to spatial frequencies represents a shift of the coordinate system.

The number of necessary observations for a square telescope extended by factor of $i$ is $$K = 2(i^2 - i) \quad (7)$$

This is because the corner A in FIG. 6 can be uniquely connected with all squares but itself it will yield therefore $i^2 - 1$ unique pairs. Corner B in FIG. 6 may be again uniquely connected with all squares with the exception of those in the upper row and right column since these combinations were already obtained from A giving additional $(i-1)^2$ pairs. No other unique connections may be found, therefore, the number of observations K equal to $i^2-1+(i-1)^2$ which becomes $2(i^2-i)$ as set forth in Equation 7.

The number of observations for square aperatures and hexagonal aperatures are given in Table I for $i \leq 11$.

TABLE I

| Increase factor i | No. of observations | |
|---|---|---|
| | Square area | Hexagonal area |
| 3 | 12 | 9 |
| 5 | 40 | 30 |
| 7 | 84 | 63 |
| 9 | 144 | 108 |
| 11 | 220 | 165 |

Figure 8:
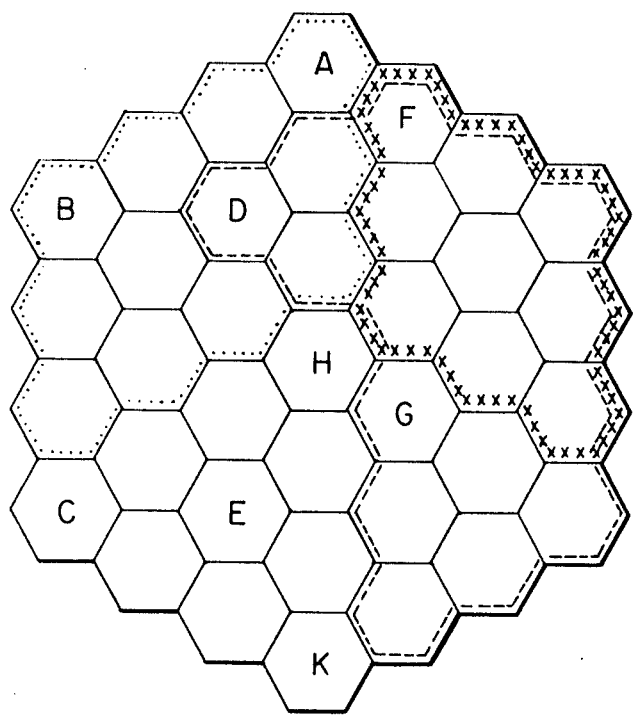
FIG. 8 is a schematic illustration of a plurality of hexagonal apertures arranged in two dimensions.

FIG. 8 illustrates the hexagonal structure. Two hexagonal segments are needed for each observation. The observation for a pair having a given separation distance and azimuth orientation is identical to all pairs having the same separation and orientation. Thus, an observation for pair B and C is identical to observations for pairs D and E, F and G, H and K and so on. The total number of segments ($i$ odd) may be calculated if it is noted that the number of hexagons bounded by the dotted lines is equal to:

$$\left(\frac{i-1}{2}\right)\left(\frac{i+1}{2}\right)$$

and, therefore, K, the total number of hexagons is three times as large plus one or $$K=\frac{3i^2+1}{4} \qquad (8)$$

In FIG. 8, the increase factor $i$ is 7 because the width of the total area is seven times the width of a hexagon area. From Equation 8 the number of hexagons necessary with the arrangement of FIG. 8 is calculated to be thirty-seven.

The total area of the thirty-seven hexagons is the area over which the incoherent electromagnetic waves are to be observed and represents a conventional large aperture. The area of a hexagon is the area of each of the pair of apertures which are used for the observations in the present invention. Thus, two hexagonal segments of FIG. 8 are needed for each observation. In considering the pairs of hexagons, for purposes of explanation, presume that a straight line is drawn connecting the centers of each hexagon of a given pair. Such line will have a given distance and a given azimuth angle with respect to a frame of reference. An observation made for a pair of hexagons having a center-to-center line having a given distance and azimuth will be identical to observations of all pairs of hexagons separated by the same distance and azimuth. Thus, in FIG. 8, an observation for pair B and C will be identical to observations for pairs D-E, F-G, H-K, etc. This means that when information is obtained by an observation using pair B and C, it is not necessary to make any observations with pairs D-E, F-G, H-K, etc. because the information will be the same.

The number of required observations may be derived by counting the number of new pairs obtainable, each containing one of the corners A, B and C, since any observation can be obtained by a translation of the pair of hexagon aperatures from a position in which one of the pairs occupies position A, B or C.

Starting with corner A, there are thirty-six possible pairs since corner A can form a pair with any of the other thirty-six hexagons. This is represented by the general expression $$K_1=\frac{3i^2+1}{4}-1 \qquad (9)$$

Expression 9 is merely Expression 8 minus one.

Certain observation pairs are not available from corner A but are available from corner B. For example, while pair B-C is identical to pair A-H and is therefore not new, pair B-D has a separation distance and azimuth unidentical to any pair possible from corner A and is therefore a new pair. Pair B-F is likewise a new pair. It can be determined by observation that all pairs formed by hexagon B and a hexagon within the dashed area is a new pair. The number of new pairs possible from corner B is represented by the general expression $$K_{II}=2\left(\frac{i-1}{2}\right)^2 \qquad (10)$$

Similarly, for corner C, there are new pairs which cannot be formed from corner A or corner B. For example, pair C-F has a separation distance and azimuth which cannot be duplicated by any pair which includes hexagon A or hexagon B. It can be determined by observation that all pairs formed by hexagon C and a hexagon within the area bounded by the X's are new pairs. The number of new pairs possible from corner C is represented by the expression $$K_{III}=\left(\frac{i-1}{2}\right)^2 \qquad (11)$$

The total number of independent observations is therefore $$K=K_I+K_{II}+K_{III}=\frac{3}{2}(i^2-i) \qquad (12)$$

As previously stated, in making observations it is not necessary to employ any of the hexagon apertures in the central portion of the aperture of FIG. 8 since identical observations of all pairs involving such hexagon apertures can be obtained by selected pairs of apertures in the outer circumference.

The aforesaid discussion leads to a consideration of a practical embodiment of the invention wherein an image which would have been obtained by a large aperture is derived by a sequence of observations made by a pair of smaller apertures which are positioned at selected positions on what would have been the circumference of the large aperture.

The telescope embodiment of the present invention is designed to the same optical standards as a conventional instrument. Furthermore, both objectives of the telescope embodiment have a common focus working always at the same zone of the aperture in order to achieve a system which is invarient from the aberration viewpoint.

The telescope of the embodiment is aplanatic in order for the image to be perfect over an extended area with no non-linear spatial phase shift and so that it may be assumed that all parts of the wavefront converging to points located near the axis of the telescope have the same radius.

Figure 9:
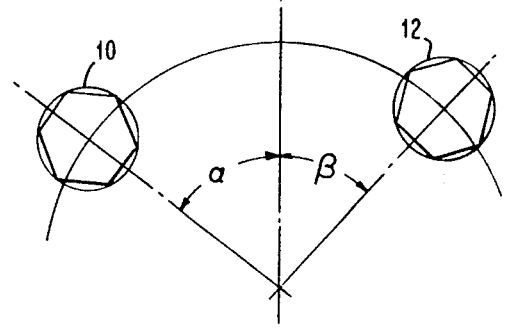
FIG. 9 is a schematic illustration of two mirrors having hexagonal apertures which can be rotated on radial arms to selected positions, the illustration being useful in the explanation of the present invention.

Referring to FIG. 9, an illustration is provided which shows in simple form the basic operational features of the telescope embodiment to be later more fully described. The two mirrors 10 and 12 at the circumference are off axial parts of the main hyperboloidal mirror of a large aperture aplanatic telescope. All separate observations are made by changing the angular positions of the two mirrors. A rotational movement is used because it is most easily accomplished and most accurate. The shape of each mirror is circular and each is associated with a hexagonal apeture. All independent observations can be made with the two mirrors located on a circle such that their outermost tangent is along the full aperture. Their specific positions ($\alpha$, $\beta$ as shown in FIG. 9) on this circle are determined in such a way as to make them occupy positions which can be arrived at by translation from the desired ones within the aperture. The mirrors are brought to these positions by rotation on the circle since they are a part of an off axial hyperboloid surface. Simultaneously, the hexagonal apertures are translated to the desired positions since they must retain an invariant orientation with respect to a single direction in space. All necessary observations can thus be made.

Figure 10:
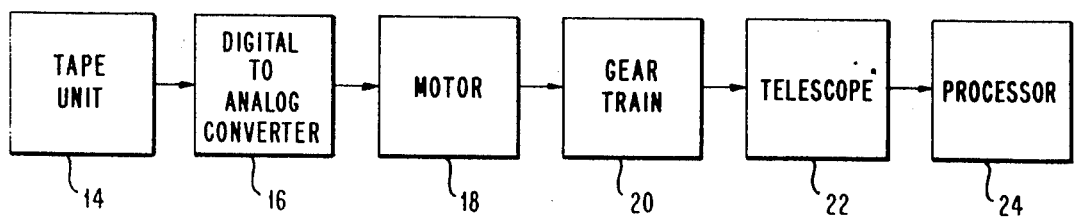
FIG. 10 is a block diagram of an embodiment of a telescope system following the principles of the present invention.

The actual embodiment of a telescope following the principles of the present invention will now be described. Referring to FIG. 10, the functional components of the telescope system are illustrated in block form. The telescope 22 includes the optical elements. Two mirrors each having a hexagonal aperture are mounted on movable radial arms which are connected to a common shaft of rotation. The common shaft of rotation is connected to a conventional telescope mount.

A conventional tape unit 14 is provided containing magnetic tape on which is stored the sequence of coordinates or angular positions at which the two mirrors of telescope 22 are to be positioned for each observation. These positions are pre-calculated according to the manner previously described and are stored in digital form on the tape in tape unit 14. Tape unit 14 reads of the sequence of positions and a conventional digital to analog converter converts the digital signals into analog position signals.

Tape unit 14 is only one example of a storage device for storing the positional information. Punched cards and a card reader could also be employed as well as a computer having a core memory.

The analog position signals are applied to a motor means 18 which may consist of two separate motors; one associated with each mirror of telescope 22. Motor means 18 is connected through a suitable gear train means 20 which drives the two mirrors via the radial arms to the sequence of predetermined positions and translates the apertures to maintain their invariant orientation with respect to a single direction in space. Observations are made at each position and each observation is recorded on a separate photographic plate.

After all the necessary observations are made and recorded the photographic plates are processed and the information on the plates is combined to produce a single composite photograph by means of processor 24. The tape unit 14, the digital to analog converter 16, the motor means 18 and the gear train means 20 are conventional devices and are not shown in specific detail. The telescope 22 and the processor 24 are unique apparatus and will now be more fully described.

Figure 11B:
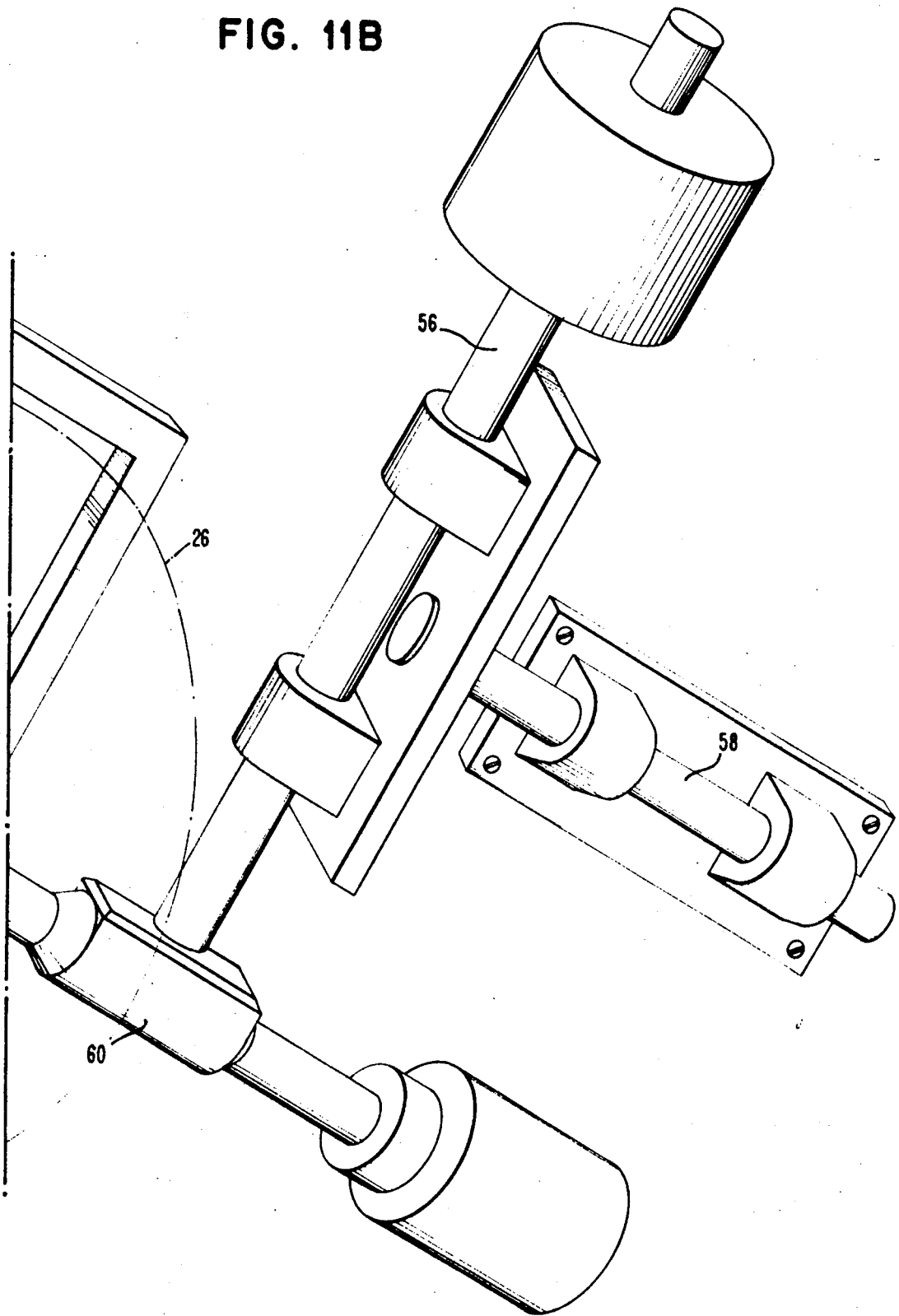

Referring now to FIG. 11, a more detailed illustration of the telescope as used for astronomical observations is provided. The basic structure of the telescope as shown follows the conventional Cassegrainian principles, however, other types of telescopes (i.e., Herschelian Newtonian) may be employed as well as refracting optics such as refractors or high quality photographic objectives.

In place of the conventional large diameter reflecting mirror, whose size is represented by circle 26, two smaller mirrors 28 and 30 are mounted on radial arms 32 and 34 respectively. Arms 32 and 34 are rotatably mounted on shaft 36. Mirrors 28 and 30 contain hexagonal aperture stops 38 and 39 respectively. Mirrors 28 and 30 are two off axial parts of what would have been the large primary mirror whose shape is dictated by optical considerations. The most useful shape would be a hyperboloid in order to secure aplanatism.

The mirrors 28 and 30 are positioned in the path of the electromagnetic waves from the object, which in the present example is light radiating from a distant star or reflected from a planet. Rays 40A and 40B represent portions of the light which are reflected by mirrors 28 and 30. The rays 40A and 40B are reflected onto mirror 41. Mirror 41 is mounted on arm 42 which is rotatably mounted on shaft 36 so that arm 42 can be moved to avoid blocking the light from the mirrors 28 or 30. The rays reflected from mirror 41 are directed through phase and position compensating means 44 and 46 which are optional devices and will be more fully described hereinafter. The rays are then directed to a common focus on detector means 48.

Detector means 48 is in general, a radiation sensitive means which provides a determination of the intensity of the interaction of the two rays. In the present embodiment, the detector means 48 includes a photographic emulsion which records the intensity of the interaction of the rays photographically. Alternatively, the detector means 48 may be an array of photocells or a television camera. A cylinder 50 is provided to shield detector means 48 from external light.

The rays 40A and 40B converge to a geometrical focal point on detector means 48 which will be blurred by the diffraction phenomena previously discussed. Other ray bundles converge on other portions of detector means 48. The other bundles arrive at the detector means 48 inclined at very small angles with respect to the bundle of rays 40A and 40B. A small mirror 52 is located above detector means 48 and reflects one such bundle through an opening in the shield 50 to a sensing means 54 which senses the relative phase of both beams and the position of the beams. Measuring means 54, which will be described in more detail hereinafter, provides phase and position information signals to the phase and position compensating means 44 and 46.

The shaft on which arms 32, 34 and 42 rotate is mounted at a right angle to a declination axle 56 which in turn is mounted at a right angle to a polar axle 58. Axles 56 and 58 constitute a typical telescope mount and is shown as an example, however, other type mounts may be employed and the mount itself is not necessary to the operation of the invention.

The operation of the telescope of FIG. 11 follows the operation set forth with reference to FIG. 10. Thus, each position of the pairs of mirrors 28 and 30 for the sequence of observations is predetermined. These positions and the number of observations required will, as previously described, depend on the size of the circle 26 and the diameter of the apertures 38 and 39. This sequence of information, which has been stored in magnetic tape is converted into actual mirror positions by means of the digital to analog converter, the motor means and the gear means. The motor and the gear means for rotating the arms 32 and 34 may be mounted within housing 60. The gears for translating the apertures 38 and 39 may directly engage the apertures such as gears 29 and 31 and may be connected to and driven by the motor means in housing 60 via pulleys or chains located in arms 33 and 35. One skilled in the art will appreciate that any number of servo arrangements may be provided to position arms 32 and 34 and apertures 38 and 39 at selected angular positions in response to an input electrical signal and therefore the specific details of the motor and gear arrangements should be obvious and are eliminated from the drawing for purposes of clarity.

For each of the separate required observations the intensity of the interaction of the converged pairs of wave portions is photographically recorded on a separate photographic plate by detector means 48. Detector means 48 may be a camera-like device containing a roll of photographic emulsion which is advanced frame by frame for each observation either by manual control or by a simple automatic mechanism.

It was previously stated that the telescope of FIG. 11 may require phase and position compensation. For this purpose, a small ray bundle (beams 62A and 62B) is reflected through an opening in shield 50 by mirror 52. Phase and position information is obtained from the reflected ray by sensing means 54 which produces phase and position compensating signals which are applied to phase and position compensating means 44 and 46. The theory and structure of means 54 will now be discussed.

The two parts of spherical wave to be observed should arrive at the plane of the detector means 48 in exactly the same phase and to exactly the same position in all observations. While changing the positions, the mirrors may independently change their distance from the focal plane, introducing a difference in the optical path, and they may be tilted altering the geometrical position of the images on the detector means 48. These errors may be corrected using a pair of phase and position compensating means 44 and 46. The phase and position compensating signals applied to compensating means 44 and 46 are derived from sensing means 54 which is responsive to the ray reflected by mirror 52. Sensing means 54 contains a position adjustment signal producing means and an optical path equalization signal producing means for phase adjustment.

The first adjustment to be made is that of position. The position adjustment or compensation may be accomplished by employing what is referred to in the art as a start tracker, since the two parts of the spherical wave to be observed come from a distant star.

Figure 12:
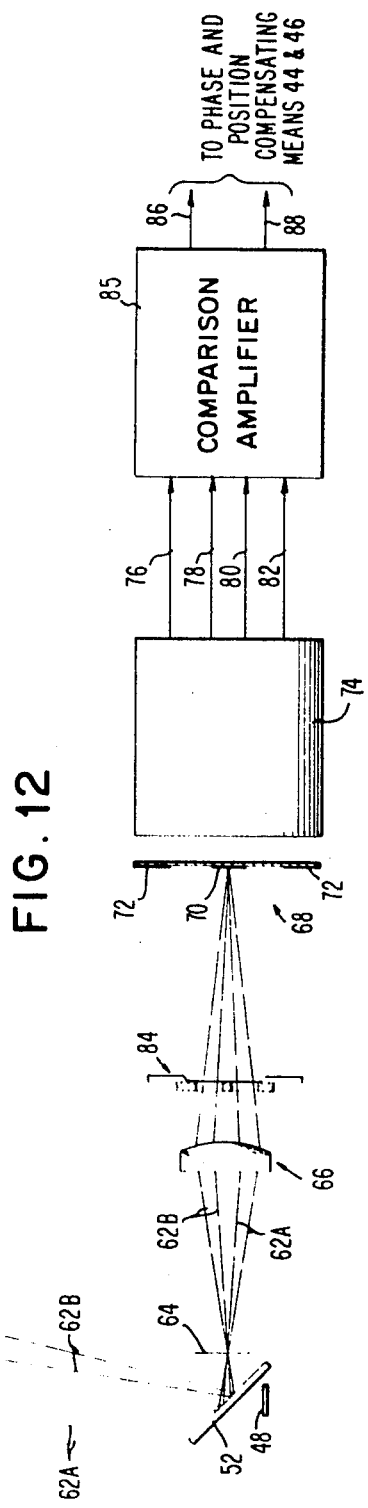
FIG. 12 is a schematic illustration of a position sensing device which may be employed in the embodiment of FIG. 11.
Figure 13:
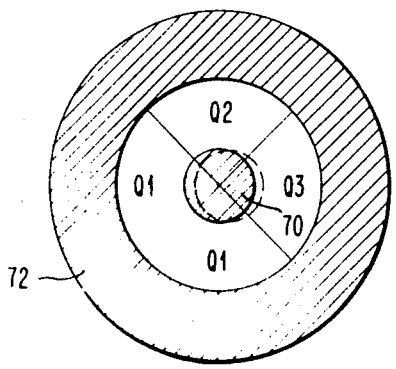
FIG. 13 is an illustration of a graticule and photomultiplier used in the device of FIG. 12.

Referring to FIG. 12, a sensitive star tracker apparatus for producing a position adjustment signal and which forms a portion of sensing means 54 is illustrated. The detector means 48 and mirror 52 have been discussed with respect to FIG. 11. The focal point of the two beams 62A and 62B of the ray bundle which would normally be on the detector means 48 is caused by mirror 52 to occur at point 64. The focal point is magnified by lens 66 and is imaged on a graticule 68. Graticule 68 is formed of transparent material and has an opaque center region 70 and an opaque outer ring 72 as shown in cross section in FIG. 12. A photomultiplier device 74 is located behind graticule 68. Photomultiplier device 74 is arranged such that it has a circular responsive surface divided into four separate quadrants, and each quadrant produces an output signal representative of the amount of light impinging on the quadrant. In FIG. 13 the front view of graticule 68 is shown and the four quadrants of the photomultiplier device 74 behind the graticule are illustrated and designated Q1, Q2, Q3, and Q4.

When the mirrors 28 and 30 of the telescope are correctly positioned, each ray 62A and 62B is centered on and overlaps the center opaque region 70. Thus, each of the four quadrants of the photomultiplier device 74 will receive an equal amount of light and each of the photomultiplier device output leads 76, 78, 80, and 82 (FIG. 12) will produce signals of equal value.

A shutter 84 is provided between lens 66 and graticule 68 so that either beam 62A alone or beam 62B alone can be directed onto the graticule 68. If either one or both rays 62A and 62B are not centered on the graticule, the output signals on leads 76, 78, 80, and 82 will not be equal. For example, if one of the rays was off center so that photomultiplier device quadrant 3 received more light than photomultiplier device quadrant 1, as shown by the dotted circle in FIG. 13, then the output signal on lead 78 from quadrant 3 would increase a given amount and the output signal on lead 76 from quadrant 1 would decrease a corresponding amount. Thus, the relative values of the output signals on leads 76, 78, 80, and 82 provide an indication of the direction and the amount that a given beam is off-position.

The output signals on lead 76 (from quadrant 1) and lead 78 (from quadrant 3) are compared in amplifier 85 to produce an X error signal on lead 86 if the signals on leads 76 and 78 are not equal. The output leads 80 (from quadrant 2) and 82 (from quadrant 4) are compared in amplifier 85 to produce a Y error signal on lead 88 if the signals on leads 80 and 82 are not equal. Leads 86 and 88 are connected to phase and position compensating means 44 and 46 of FIG. 11.

Figure 14:
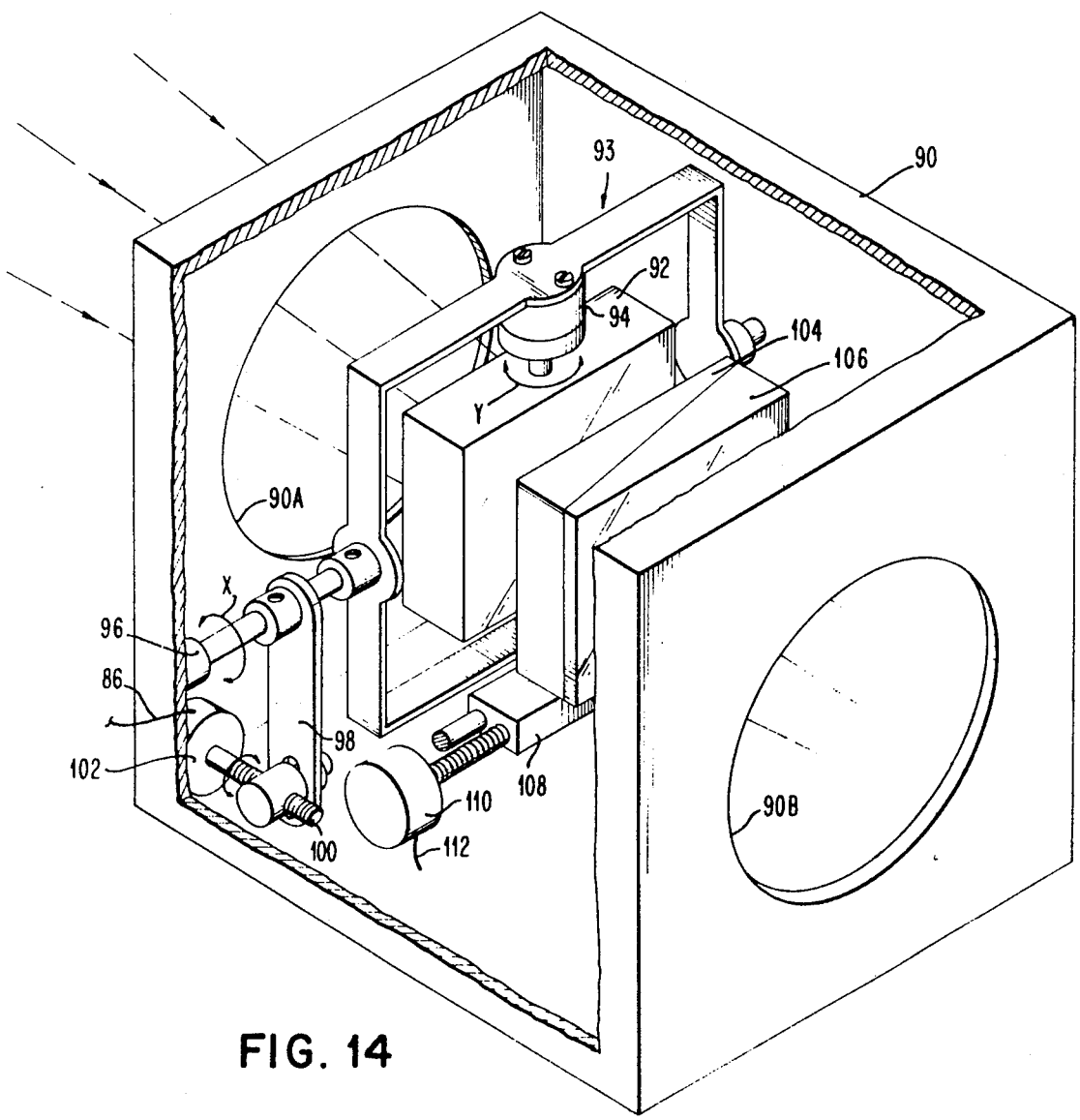
FIG. 14 is an illustration of a phase and position compensating device which may be used in the embodiment of FIG. 11.

FIG. 14 shows in detail phase and position compensating means 44. Phase and position compensating means 46 is similar to means 44 with one exception which will be described. Phase and position compensating means 44 includes an enclosure 90 having openings 90A and 90B through which the light beams pass. It is immaterial whether the light beams enter opening 90A and leaves opening 90B or vice versa. The position compensating portion of the apparatus consists of an optical element 92, which is a plane parallel plate of suitable size and of interferometric quality which is mounted on a gimbal 93 so that it can be rotated about both an X and a Y axis. The Y rotation is performed on an axle 94 and the X rotation is performed on an axle 96. Considering the rotation about the X axis, axle 96 is connected by an arm 98 to a lead screw 100 which is advanced by motor 102. Motor 102 is driven by the X error signal on lead 86 from the star tracker device of FIG. 12 previously described and causes plate 92 to rotate until the X error signal is reduced to zero as the beam is centered on the graticule 68 of FIG. 12 in the X direction. This is a typical servo arrangement.

An identical arm lead screw and motor arrangement is used to rotate the plate 92 about the Y axle 94. The Y motor would be driven by the Y error signal on lead 88 from the star tracker device. Since the rotation mechanism for the Y axle 94 is identical to arm 98, screw 100 and motor 102, an illustration of the rotation mechanism for Y axle 94, has been eliminated from FIG. 14 for the purposes of clarity. The rotation of the plate 92 in X and Y directions adjusts the position of the light ray and preserves the coordinate system of the telescope.

After passing through plate 92, the light beam passes through two wedges 104 and 106, which in combination are equivalent to a second plane parallel plate. It is only necessary to include the wedges 104 and 106 in one of the phase and position compensating means (i.e., means 44). In the other phase and position compensating means 46 the two wedges are substituted for by a single optical plate. The wedge 104 is positioned on a kinematic slide 108 which in turn is shifted by an electric motor 110. The wedges 104 and 106 constitute a compensator, a well-known means of introducing a small phase shift. Motor 110 is connected via lead 112 to a means for producing a signal which will cause motor 110 to shift wedge 104 with respect to 106 a given amount which will correct for phase shift. The means for providing the error signal to motor 110 on lead 112 is located in sensing means 54 of FIG. 11 along with the star tracker apparatus described with respect to FIG. 12. A detailed illustration of the phase shift error signal means is provided in FIG. 15.

Figure 15:
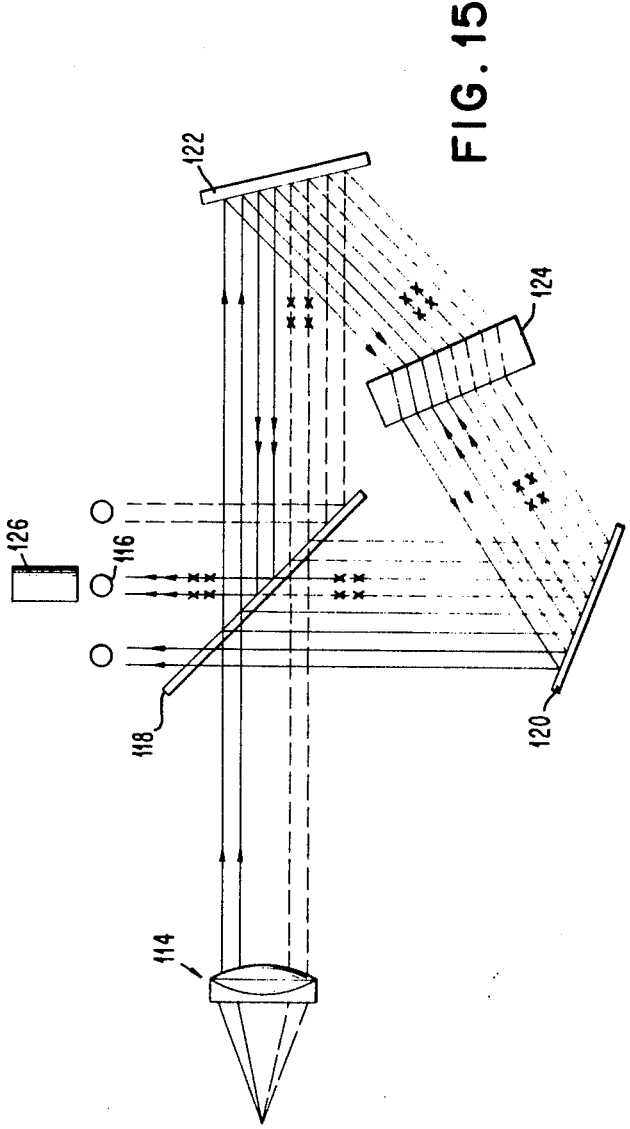
FIG. 15 is a schematic illustration of a phase sensing device which may be employed in the embodiment of FIG. 11.

Referring to FIG. 15, the phase shift means for optical path equalization is achieved by using a variable shearing interferometer. An interferometer is a well-known optical device. A complete discussion of the theory and operation of interferometers is provided in the text "Interferometry" by W. H. Steel, published by the Cambridge University Press, Library of Congress Catalogue Card Number: 67–12140.

In FIG. 15 the light rays 62A and 62B reflected by mirror 52 of FIG. 11 are also directed by a lens 114 to the shearing interferometer, whose shear is adjusted to make the images of the two separate pupils overlap at a common pupil 116.

The interferometer includes a mirror 118 which is partially reflective, partially transmissive in one direction (i.e., left to right) and conventional mirrors 120 and 122. An optical shearing plate 124 is also included which, when tilted, changes the relative direction of light passing through it.

In FIG. 15, one beam is represented by solid lines and the other beam is represented by dotted lines and the direction of the beams as they are reflected by the mirrors are shown by arrowheads. By proper tilting of the shearing plate 124, the two beams are made to overlap at the common pupil 116. A photomultiplier 126 is located directly behind pupil 116.

Referring now to FIG. 14, the wedges 104 and 106 operate as a compensator which adjusts the phase of beam 40A with respect to beam 40B since only means 44 contains the wedges. When wedges 104 is moved with respect to wedge 106, there will be an effect detected on the output of the photocell 126 in FIG. 16. As wedge 104 is moved with respect to wedge 106, the amplitude of the output signal of photocell 126 of FIG. 15 will increase to a maximum and then begin to decrease. The desired condition is to have wedge 104 located with respect to wedge 106 at the position where the maximum output signal is produced from photocell 126 of FIG. 15. Thus, the output of photocell 126 is connected to a conventional peak detector circuit 128, the output of which is applied to motor 110 of FIG. 14 such that motor 110 stops when a peak is reached of photocell 126 thereby correctly adjusting the phase compensating portion of phase and position compensating means 44.

FIGS. 12, 13, 14 and 15 illustrate the apparatus for and the manner in which phase and position compensation is effected. However, as previously mentioned, if ideal conditions are met and extreme tolerances are employed in the construction and assembly of the mechanical portions of the telescope elements such as the radial arms and the mirror mountings, it would not be necessary to include phase and position compensating means 44 and 46 in the telescope. One skilled in the art will also appreciate that alternative devices may be employed for phase and position compensation rather than the devices shown in the embodiment.

After all the necessary observations have been made by the telescope and each observation recorded on a separate photographic plate at detector means 48 of FIG. 11, the separate recorded observations must be combined to produce a single image. This procedure is carried out by the processor means 24 of FIG. 10. The procedure carried out by the processor 24 has been previously set forth in the discussion of theory of operation of the telescope. The Fourier transform of the recorded intensity distribution of each recorded observation is determined. The low frequency redundancy is removed and the spectras are added. The resultant added spectras are then inversely Fourier transformed to provide a single image. The resultant single image obtained is the same as an image obtained through a conventional telescope.

It would be possible for one skilled in the art to digitize the information on each photographic plate and perform the above-described calculation with a digital computer and use the resultant computer output to construct a single image. However, an optical scheme for obtaining a single image using holography is also possible and will now be described.

Figure 16:
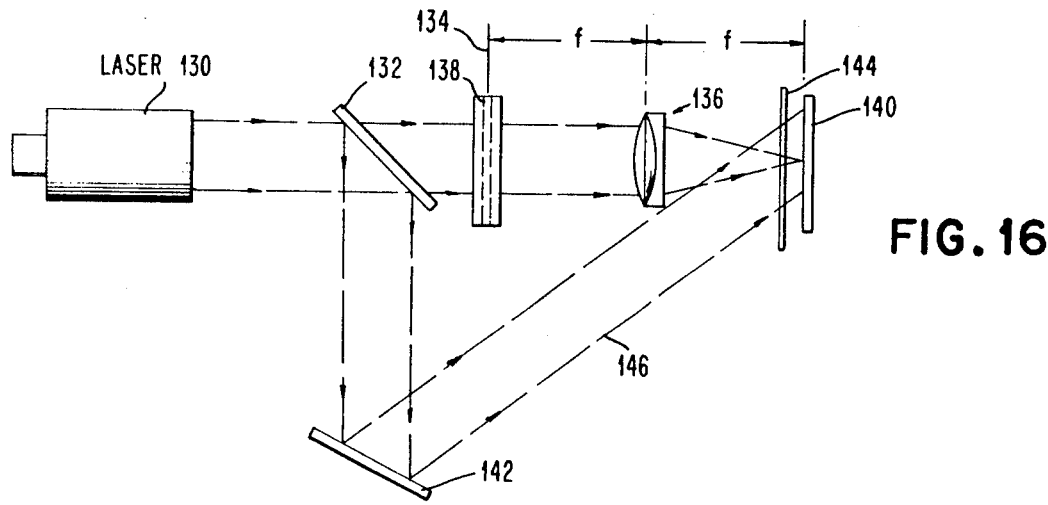
FIG. 16 is a schematic illustration of an embodiment processing device employed in the present invention.

Referring to FIG. 16, the apparatus for obtaining the single composite photograph is illustrated. In FIG. 16 a source of coherent light, such as a laser 130, is provided. The light from the laser 130 is directed through a beam splitter 132 and a portion of the laser light is directed through the photographic plates containing the observations which are located sequentially, one at a time, in the front focal plane 134 of lens 136. By directing the coherent light through each of the photographic plates in plane 134, wavefronts containing the information of the observations are produced. It may be useful to immerse each of the photographic plates in an oil bath 138 to suppress any phase errors which may occur due to variations in the thickness of each of the separate photographic plates. A photographic emulsion plate 140 is located in the Fourier transform plane of lens 136. The portion of the laser beam reflected from beam splitter 132 is directed by a mirror 142 onto emulsion 140 as a reference beam 148 where it interferes with the wavefronts from the photographic plates located in plane 134 to form a hologram in a conventional manner. Since the photographic plate 140 is located in the Fourier transform plane, that is, the image plane of lens 136, the photographic plate 140 would normally record a power spectrum $I_1(x, y)$ of the recorded observation in plane 134. However, since the coherent reference beam is being employed, then the amplitude in the $f$, $g$ (Fourier plane will be $$A(f, g) = A_0 e^{-ikt} + F(f, g)$$

and the photographic emulsion 140 will record $$I(f, g) = A(f, g) A^*(f, g) = A_0^2 + [F(f, g)]^2 + A_0 e^{+ikt} F(f, g) A_0 e^{-ikt} F^*(f, g)$$

where * represents the complex conjugate.

Since each of the separate recorded observations placed in plane 134 were made with the pair of telescope apertures at different positions, the spectra will occupy distinct regions on the plane of the photographic plate 140. The regions which do not contain the spectra will be uniformly gray and should be masked out. Thus, for each recorded observation photograph placed in plane 134, a separate mask 144 will be disposed in front of photographic plate 140. The masks are opaque plates which have two openings located in accordance with the spatial spectrum recorded on the particular observation photograph. Since the location of the spatial spectrum recorded on each observation photograph corresponds directly to the position of the mirrors during the observation, each of the masks 144 can be constructed in advance and the appropriate mask employed with the corresponding recorded observation photograph in plane 134.

After all the observations are recorded on photographic emulsion 140, the emulsion is developed in a conventional manner and a hologram is formed.

To reconstruct the image of all the combined observations, the hologram 140 is placed in its original position in the Fourier transform plane of lens 134. The hologram 140 is then illuminated with reference beam 146 producing the synthesized image. The term of interest is $$A_1 = A_0^2 F(f, g)$$

In the focal plane 140 of the lens 136, the Fourier transform of $A_1$ is obtained:

$$I_2(x, y) = C \iint F(f, g) e^{i2\pi(xf+yg)} df dg$$

which is essentially a coherent image of $I_0(x, y)$. Weights can be applied by putting a filter in the frequency domain of linearly decreasing transmission as function of $$\rho = \sqrt{f^2 + g^2}$$

and the image obtained and viewed in plane 134 would look as if taken through a normal telescope.

When a digital computer rather than the hologram device of FIG. 16 is employed to process the separate observations into a single image, a coarse-fine operating technique could be employed. In this technique, the computer processes enough data to produce a coarse image which is then viewed. If there is anything of interest in the image, then a more detailed precision processing of the information is made. This approach would be useful in applications such as satellite observations wherein if the coarse image does not contain anything of interest, precision processing is not performed, thereby providing a resultant saving in computer time.

The foregoing description and figures related to a novel image forming method and apparatus and to a particular embodiment of the apparatus employed as an astronomical telescope. The present invention is not limited to the described telescope embodiment and can be employed with other incoherent electromagnetic waves in order to form an image of an object, particularly where a large aperture is desired but cannot be easily realized. Thus, the use of mirrors and apertures in the telescope embodiment was just one example of image forming, and equivalents, such as lenses, etc., could be employed depending on the desired application of the invention.

In order to more fully indicate the scope of the present invention and in orded to illustrate that the novel method is not the inherent function of the telescope, a second embodiment of the invention as an X-ray microscope, which employs another example of image forming elements, will be shown and briefly described.

Figure 17:
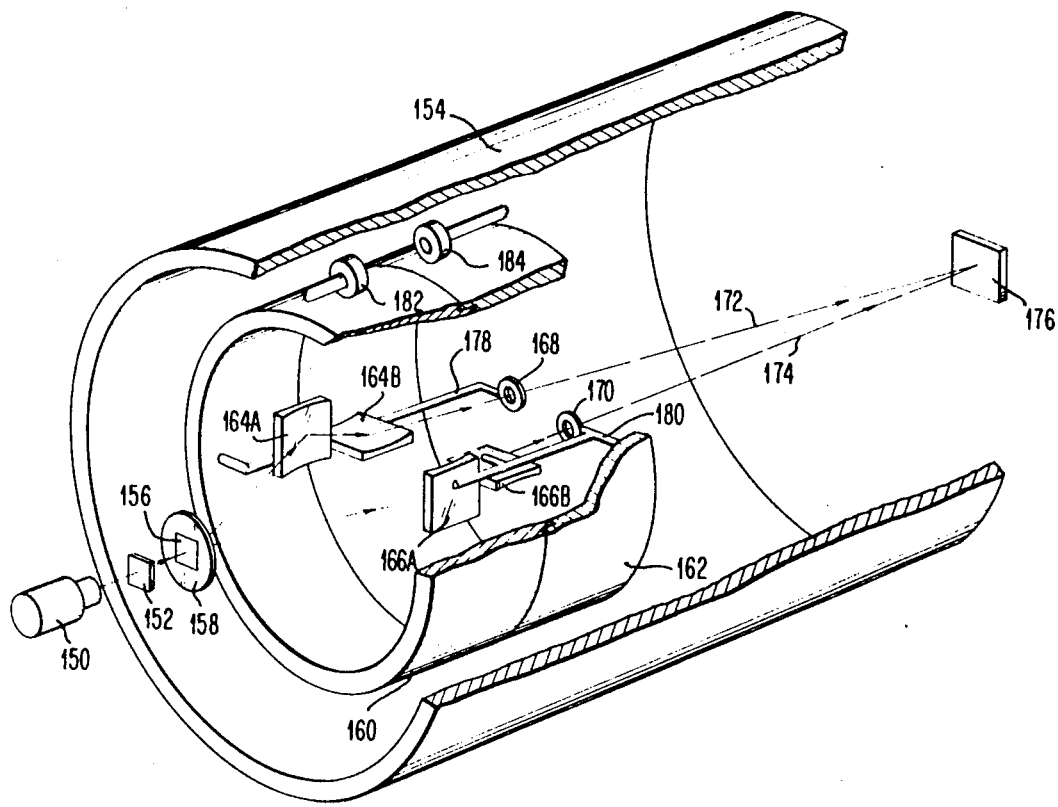
FIG. 17 is a schematic illustration of an embodiment of an X-ray microscope following the principles of the present invention.

Referring to FIG. 17, a schematic illustration of an X-ray microscope is shown. An electron beam source 150 is provided and directs a beam of electrons onto a target 152 which is made, for instance, from aluminum causing the target to emit the X-ray radiation. Target 152 is located in the barrel of the microscope 154. The X-ray radiation from target 152 is directed to a specimen 156 also located in the barrel 154 by a specimen holder 158. The distance between the target 152 and the specimen 156 is chosen such that the specimen 156 will be illuminated incoherently. The X-ray waves are diffracted on the specimen 156 and most of the waves will be directed to a pair of internal independently rotatable cylinders 160 and 162. The cylinders 160 and 162 contain means for sampling separate pairs of portions of the X-ray waves. The sampling means consists of first and second pair of mirrors 164A and 164B and 166A and 166B. Mirrors 164A, 164B, 166A and 166B may be constructed of glass having a gold coating. Mirrors 164A and 164B have associated therewith a stop assembly 168 and mirrors 166A and 166B have an associated stop assembly 170. Each of the two pairs of mirrors constitute a grazing incidence X-ray microobjective similar to the type illustrated and described on page 27 of the text "A Long-Wavelength X-Ray Microscope" by James Francis McGee, published 1956 by University Microfilms, Ann Arbor, Mich.

The dotted lines 172 and 174 from the specimen 156 illustrate the path of the X-ray radiation as it is directed to a common focus on the detector means 176. Detector means 176 may include a photographic emulsion similar to the detector means 48 of FIG. 11. Mirrors 164A and 164B and stop assembly 168 are mounted on a common holder 178 which is fixed to the inside of cylinder 160. Likewise, mirrors 166A and 166B and stop assembly 170 are mounted on a common holder 180 which is fixed to the inside of cylinder 162. In the X-ray microscope, the pairs of mirrors and the stop assemblies are equivalent to the apertures and mirrors of the telescope embodiment of FIG. 11. Each of the pairs of mirrors and the associated stop assembly may be moved in a circle by the rotation of the cylinders 160 and 162 to generate a circumference. Friction wheel 182 is connected to a suitable motor and is used to drive cylinder 160. A similar friction wheel 184 is coupled to a suitable motor and is used to drive cylinder 162, thereby locating the mirrors at selected positions on the circumference so that observations can be made and recorded at detector means 176.

The number of observations and the positions at which the observations are made are in accordance with the theory described for the telescope embodiment of FIG. 11. Thus, the number of observations and the position of the two sets of mirrors is predetermined and stored in a suitable storage device, such as a tape unit, as shown in FIG. 10. The information from the tape unit is read out and converted into analog position signals which are applied to the motors associated with the two drive wheels 182 and 184, so that the pairs of mirrors and the stops can be moved to appropriate positions in a similar manner that the mirrors and apertures of the telescope embodiment of FIG. 11 were moved to the desired locations for the observations. After all the observations are recorded by the detector means 176, the information is processed to form a single image in the same manner as described for the telescope embodiment. Modifications to the structure of FIG. 17 are possible within the scope of the invention. For example, both double mirror objectives can be replaced by Fresnel Zone plates and grazing incidence plane mirrors or some other suitable structure for focusing of X-ray radiation capable of preserving its phase without damaging the scope of the instrument.

While the invention has been particularly shown and described with reference to preferred embodiments thereof, it will be understood by those skilled in the art that various changes in form and details may be made therein without departing from the spirit and scope of the invention.

What is claimed is:

1. A system for obtaining the intensity distribution of an object which is the source of a set of incoherent electromagnetic waves containing information related to the object comprising:

means for sequentially sampling separate pairs of portions of said waves, image forming means for optically converging each of said sampled pairs of portions of said waves to a common focus, recording means located at said common focus for recording the intensity of the interactions of each of said converged pairs of wave portions, and means for combining all of the recorded intensity of interactions of said converged pairs to form a single intensity distribution of said object.

2. The system of claim 1 wherein said means for sampling separate pairs of portions of said waves includes first and second aperture means, means for serially locating said aperture means at predetermined positions in the path of said waves to permit the passage of pairs of portions of said waves at each of said positions, and wherein said means for converging said pairs of portions of said waves includes a mirror located behind each of said aperture means for reflecting said pairs of portions of said waves to a common focus.

3. The system of claim 2 wherein said aperture means and said mirrors are located sequentially at predetermined positions on a circumference.

4. The system of claim 3 including first and second radial arms independently rotatable about a common center, an aperture means and a mirror mounted on the end of each of said first and second radial arms, means for rotating said first and second radial arms sequentially to a plurality of predetermined angular positions to sequentially locate said aperture means and said mirror on each arm at predetermined positions on a circumference, and means for rotating each of said aperture means on the ends of said radial arms to maintain an invariant orientation of said aperture means with respect to a single direction in space.

5. The system of claim 4 wherein said first and second aperture means have hexagonal openings to permit the passage of said pairs of portions of said waves onto said mirrors at each of said plurality of predetermined positions on said circumference.

6. A system according to claim 1 wherein said sampling means includes a first and second aperture means and said image forming means includes a first and second mirror, said first mirror located behind said first aperture means and said second aperture located behind said second aperture.

7. A system according to claim 1 wherein said recording means located at said common focus includes a plurality of photographic emulsion means, each emulsion means recording to the intensity of interaction of a separate one of each of said converged pairs of wave portions.

8. A system according to claim 7 wherein said means for combining all of said recorded intensity of interaction of said converged pairs includes a source of first and second beams of coherent light, a lens means optically having a Fourier transform plane and a front focal plane, said lens means being located in the path of said first coherent light beam, a photographic emulsion plate located in the Fourier transform plane of said lens means in the path of said first coherent light beam, and means for directing said first coherent light beam in sequence through each of said plurality of photographic emulsion means located one at a time in the front focal plane of said lens, and for directing said second coherent beam directly onto said photographic emulsion plate to interfere with said first beam to form a hologram containing the information recorded on said plurality of photographic emulsion surfaces.

9. A system according to claim 1 further including phase and positoin sensing means responsive to said converged pairs of wave portions for producing phase and position compensating signals, and phase and position compensating means located in the path of said sampled pairs of wave portions and responsive to said phase and position compensating means for correcting phase and position errors.

10. An X-ray microscope system for obtaining the intensity distribution of an object which is the source of a set of incoherent X-ray radiation waves containing information related to the object comprising:

means for sequentially sampling separate portions of said X-ray waves, means for converging each of said sampled pairs of portions of said X-ray waves to a common focus, recording means located at said common focus for recording the intensity of the interactions of each of said converged pairs of wave portions, and means for combining all the recorded intensity of interactions of said converged pairs to form a single intensity distribution of said object.

11. An X-ray microscope system according to claim 10 wherein said converging means includes a grazing incidence X-ray micro objective.

12. A method for obtaining the intensity distribution of an object which is the source of a set of incoherent electromagnetic waves containing information related to the object comprising the steps of:

sequentially sampling separate pairs of portions of said waves, optically converging each of said sampled pairs of portions of said waves to a common focus, recording at the common focus the intensity of the interactions of each of said converged pairs of wave portions, and combining all of the recorded intensity of interactions of said converged pairs to form a single intensity distribution of said object.

References Cited

UNITED STATES PATENTS 1,451,302  4/1923  Mihalyi.

OTHER REFERENCES

Jenkins et al., "Fundamentals of Optics," 3rd ed., McGarn-Hill, New York, 1957, pp. 322–324.

DAVID SCHONBERG, Primary Examiner

R. J. STERN, Assistant Examiner

U.S. Cl. X.R.

250—53; 350—162, 292, 320